United States Patent [19]

Adams, Jr.

[11] Patent Number: 4,570,718

[45] Date of Patent: Feb. 18, 1986

[54] OIL LEVEL SENSOR SYSTEM AND METHOD FOR OIL WELLS

[76] Inventor: Harold P. Adams, Jr., 101 Elm St., Oil City, Pa. 16301

[21] Appl. No.: 684,481

[22] Filed: Dec. 21, 1984

[51] Int. Cl.$^4$ ............................................. E21B 47/04
[52] U.S. Cl. .................................. 166/369; 166/247; 166/105.2; 250/357.1; 417/36
[58] Field of Search ...................... 166/369, 105.2, 247, 166/250, 252, 53, 65 R; 250/357.1; 340/618, 853, 854; 376/118, 160, 166; 417/36, 38, 44

[56] References Cited

U.S. PATENT DOCUMENTS

| | | | |
|---|---|---|---|
| 2,323,128 | 6/1943 | Hare | 250/83.6 |
| 2,952,774 | 9/1960 | Howard | 250/43.5 |
| 2,972,050 | 2/1961 | Allen | 250/43.5 |
| 3,437,992 | 4/1969 | Johnston | 340/18 |
| 3,654,458 | 4/1972 | Burrus et al. | 250/357.1 X |
| 3,915,225 | 10/1975 | Swink | 166/65 R X |
| 3,965,983 | 6/1976 | Watson | 166/369 X |
| 4,012,712 | 3/1977 | Nelligan | 340/18 |
| 4,023,136 | 5/1977 | Lamensdorf et al. | 340/18 |
| 4,181,468 | 1/1980 | Kent et al. | 417/63 |
| 4,215,426 | 7/1980 | Klatt | 367/83 |
| 4,318,298 | 3/1982 | Godbey et al. | 73/155 |
| 4,391,135 | 7/1983 | Godbey et al. | 73/155 |
| 4,392,789 | 7/1983 | Kuehn, III et al. | 417/36 |

Primary Examiner—Stephen J. Novosad
Assistant Examiner—David J. Bagnell
Attorney, Agent, or Firm—Webb, Burden, Robinson & Webb

[57] ABSTRACT

A system for controlling production in an oil well comprises a controller for activating the means for causing reciprocation of the sucker-rods; a sensing means secured to the outer surface of the production tubing near the lower end thereof comprising a radioactive source spaced from a radioactivity detector such that oil at that level will fill the said space, means associated with said radioactivity detector for counting the output of the detector and establishing an "off signal" when the frequency of the output is indicative of no oil in the said space; means for converting the "off signal" into an acoustical signal directed up the borehole; and receiving means at the top of the borehole for detecting the acoustical representation of the "off signal" and transmitting it as an electric signal to said controller.

12 Claims, 3 Drawing Figures

OIL LEVEL SENSOR SYSTEM AND METHOD FOR OIL WELLS

BACKGROUND OF THE INVENTION

Few oil wells are self-flowing. Most wells must be pumped. Almost all of the wells made to produce by pumping are equipped with sucker-rod activated pumps. In these wells, the pump is installed at the lower end of the tubing string and is actuated by a string of sucker-rods extending down from the surface to the pump. The sucker-rods are attached to a polished rod at the surface. The polished rod extends through a stuffing box and is attached to the mechanical unit which produces the necessary reciprocating motion to actuate the sucker-rods and the pump. Typically, the polished rod is attached at its upper end to a walking beam pivotally mounted to a post. A counterbalancing weight may be directly or indirectly secured to the opposite end of the beam. As the beam is rocked the string of sucker-rods is raised and lowered.

In typical operation the oil in the borehole is pumped out. Then, pumping is discontinued and oil is allowed to seep into the borehole from the surrounding oil-bearing formation. Build-up of oil in the borehole produces a back pressure which impedes the inflow from the formation. Thus, productivity is reduced if the oil in the borehole is not timely removed after accumulating. On the other hand, it is not desirable to operate the pump after the oil level has fallen below the pump inlet. To do so causes physical damage and wearing of the pump.

Past and present practice in oil well pumping involves manually setting electric timers to control the pumping based upon an operator's estimation of the time required to extract the down-hole fluid to a point where no more fluid can be removed. This is known as "pumping off" a well. The disadvantages of this method are excessive wear to down-hole components due to excessive pumping, unnecessary manhours needed to operate the wells and lower fluid production reducing income due to underpumping.

Automatic liquid level monitoring has been proposed wherein acoustical devices are used to sense the depth of the oil within the well. A drawback of this system is that it is affected by foam within the well. Also, it involves complicated mechanical apparatus at the well head. See, for example, U.S. Pat. No. 4,318,298.

The invention disclosed herein relates to oil well pumping and is specific to a method and apparatus which will automatically regulate the pumping of an oil well based entirely upon the detected fluid level in the well. It is an object of this invention to provide a means for automatic well pumping resulting in better recovery of down-hole fluids, increasing production, reducing manhours and down-hole component wear.

SUMMARY OF THE INVENTION

Briefly, according to this invention there is provided a system for controlling production (pumping) in an oil well. An oil well comprises a cased borehole, tubing within said casing and a pump at the lower end of the tubing. The pump forces oil up through the tubing. Sucker-rods extend down into said tubing for mechanically activating said pump. At the top of the borehole (the well head) is a device for causing vertical reciprocation of the sucker-rods. All that has been described so far in this paragraph is admittedly old in the art. The system according to this invention includes, in combination with the aforesaid, a controller for activating the reciprocating device, say a walking beam, for raising and lowering the sucker-rods. The controller outputs a signal that directly or indirectly activates an electrical or hydraulic motor. Down hole, according to this invention, a unique level sensing unit is positioned, at the level at which the oil is pumped down to and at which pumping should be discontinued. This is usually just above the pump. The level sensor comprises a radioactive source spaced from a radioactivity detector. Preferably, the source is a gamma radiation source, for example, Cesium 137. Gamma radiation from Cesium 137 has a unique energy (1.176 Mev) not otherwise found in the natural gamma radiation of the borehole. Spaced from the source is a radioactivity detector. The spacing may be, for example, five or six inches and the detector when no oil is therebetween will sense between about 200 and 300 impulses per minute. When oil fills the space between the source and the detector the rate at which impulses are sensed will significantly diminish. The detector may comprise a solid-state gamma transducer selective for the radiation produced by Cesium 137. A rate counter is attached to the output of the gamma transducer and when the rate is indicative of the no oil condition, an "off signal" is passed by the counter to a sonic transducer for generating a high frequency acoustical signal directed up the borehole. The rate detector may comprise a digital circuit or microcomputer based upon low energy consumption chip technology such as CMOS or the like. The power supply for the detector, rate counter, and acoustical transducer is a long-life, rechargeable battery such as nickel cadmium or lithium batteries. Since, the temperature of all elements of the circuitry inevitably rises to the down-hole temperature at the level of the sensing unit, the life of even the long-life batteries may be too short to be practical. Thus, it may be necessary to provide a charging device, for example, an alternator that is activated by alternating mechanical conditions near the sensor. Preferably, there is a piston or diaphragm in communication with the interior of the tubing that is moved back and forth with each stroke of the sucker-rods. A permanent magnet is magnetically coupled to the piston or diaphragm and is thus moved in and out of a stationary coil in series with a rectifying circuit that charges the battery. An acoustical receiver (solid-state microphone) is positioned at the well head to pick up the acoustical signals directed toward it from down hole. The acoustical signal is converted to an electrical "off signal" that is transmitted to the controller.

According to a preferred embodiment, the borehole is provided with two level sensors. The second unit is positioned above the first, say from 5 to 5000 feet, and is arranged to generate an "on signal" to start pumping when the oil reaches the level of the second sensing unit. The second sensing unit may be identical in structure to the first sensing unit except that the sonic transducer should be made to produce a sonic signal differing in some detectable respect, say frequency, from the sonic signal produced by the first sensing unit. With the described apparatus, pumping can be stopped precisely when the oil level reaches the lower sensing unit and pumping can be resumed precisely when the oil level reaches the upper sensing unit. No assumptions need to be made regarding the time for the pump off to be completed or the time when the well is again ready for pumping. This condition can change with time and may be automatically adjusted for by the system.

DESCRIPTION OF THE DRAWINGS

Further features and other objects and advantages of this invention will become clear from the following detailed description made with reference to the drawings, in which.

DETAILED DESCRIPTION OF THE PREFERRED EMBODIMENTS

Figures 1, 2:
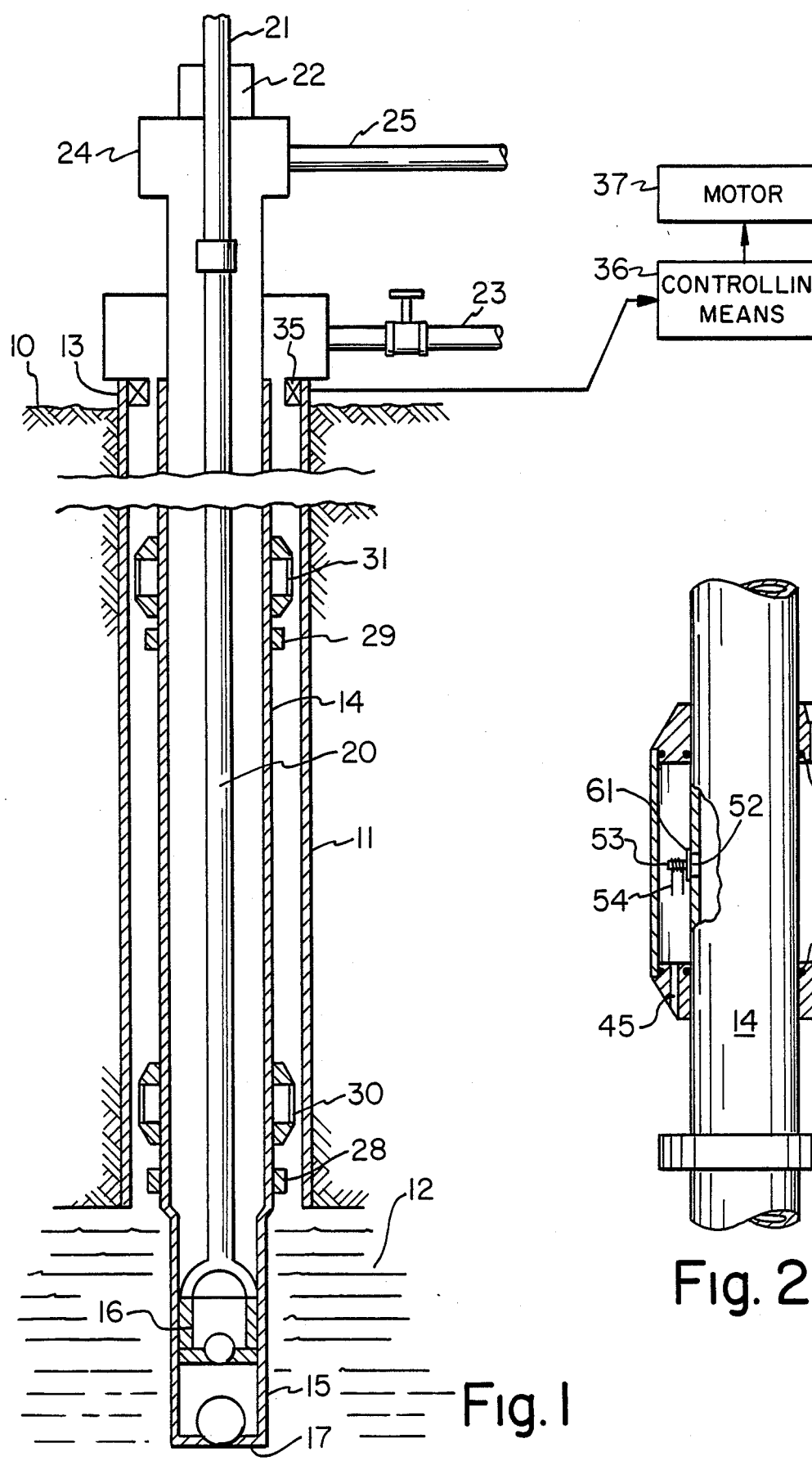
FIG. 1 is a schematic view of an oil well equipped for pumping with sucker-rods and with apparatus for practicing the system and method according to this invention.
FIG. 2 is a section view through a down-hole enclosure for containing the radioactivity sensor.

Referring now to FIG. 1, there is shown a schematic view of an oil well which is equipped for pumping with sucker-rods. The ground level 10 is indicated with a bore 11 extending downwardly therefrom until the producing formation 12 is encountered. As is typical, the bore is cased with steel casing 13 for maintaining the integrity of the bore. Hung from the surface within the steel casing is steel tubing 14. At the base of the steel tubing and within the producing formation 12 is located the pump barrel 15. Within the pump barrel is an inner check valve housing 16. An outer check valve 17 is within the base of the pump barrel. Extending upwardly from the inner check valve housing is a sucker-rod string 20. The topmost sucker-rod is polished rod 21. The polished rod reciprocates within stuffing box 22. Above the surface the casing is covered and vented at 23. A flow-T 24 is provided for directing the oil pumped up through the interior of the tubing to change directions and exit through flow line 25.

Hung at about the lower end of the tubing between the tubing and the casing is lower radioactive source 28. Spaced thereabove is upper radioactive source 29. Positioned just above the lower source 28 is the lower radioactivity detector 30 and just above the upper source 29 is the upper radioactive detector 31. Each radioactivity detector has associated therewith a sonic transmitter (speaker). Each detector transmits an acoustical signal having a different characteristic (such as frequency) enabling discrimination of the signals. Positioned near the vent casing is an acoustical detector 35. The detector is in communication via appropriate electrical connections with a controlling means 36 which in turn is in communication with a motor 37 for driving the pump; for example, a walking beam apparatus that causes reciprocation of the sucker-rods.

The radioactive sources 28 and 29, suitable according to this invention, are sources of gamma radiation such as a Cobalt 60 having a half life of 5.26 years or preferably Cesium 137 having a half life of 30 years. Even the Cobalt 60 has a half life adequate for the operation of many wells and such that the radioactive source will never need to be replaced during the lifetime of the well. Other sources of radiation such as beta, alpha, and x-radiation may also be used. A most preferred radioactive source is a five microcurie source of Cesium 137 having a unique energy of 1.176 Mev.

The structure for supporting the radioactive emitters may comprise two clamp-like portions of an annular structure occupying the portion of the space between the tubing and the well bore. The radioactive emitters are located in such a position around the production tubing to emit radiation substantially directly to the associated radioactivity detector positioned thereabove or therebelow.

Preferably, one radioactive emitter 38 will be situated beneath the working barrel (the device which extracts fluid from the hole) and the other radioactive emitter 29 will be situated at a predetermined level above. The radiation will be monitored by the radioactivity detectors 30, 31, by a detector such as a geiger counter, ion chamber or scintillation counter.

The radioactivity detectors may be enclosed in an annular enclosure 39 as shown in FIG. 2. The enclosure comprises an outer cylindrical wall 40 supported between two spacer rings 41, 42. Associated with each spacer ring are two O-rings 43, one for sealing the spacer to the wall 40 and the other for sealing the spacer to the outside of the tubing.

The receptor for the radioactivity detector 45 may extend through one spacer facing the radioactive source. The sonic transmitter 46 may extend through the same or the other spacer and is directed up the borehole. A most preferred detector comprises a solid-state gamma transducer selective for radiation emitted by Cesium 137. The transducer will convert the incident radiation to about 200 to 300 electrical pulses per second.

The acoustical signals output by one or more sonic transmitters 45 are monitored top hole by the acoustical detector 35. The acoustical detector 35 transmits a signal to a controlling means 36 which may be a microcomputer to electrically control activation of the pumping device by controlling the driving motor 37 thereof.

Figure 3:
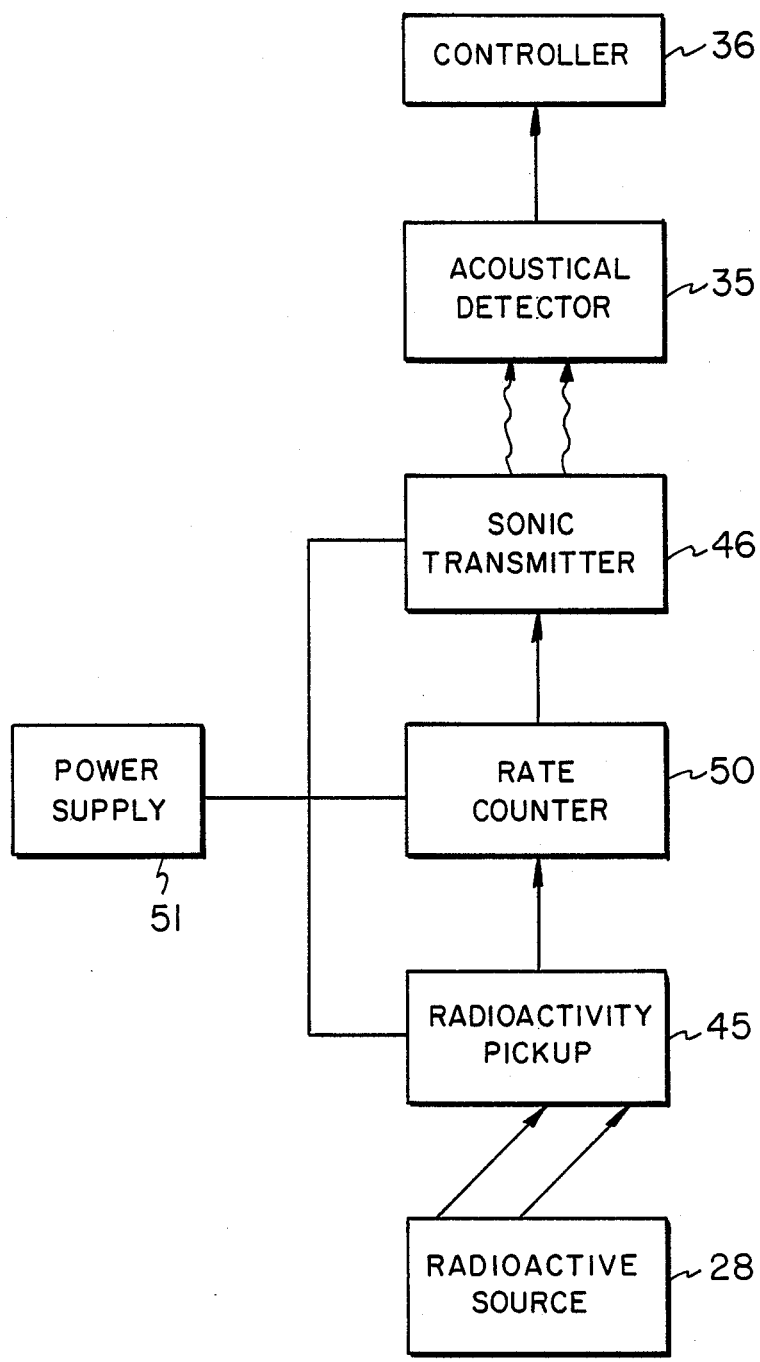
FIG. 3 is a flow diagram illustrating the operation of the system.

FIG. 3 in block diagram form illustrates the information flow and certain components according to this invention. The radioactive source 28 has already been described. The radioactive pickup 45, also already described, passes its output to a digital rate counter and comparator circuit 50. When rate thresholds are crossed, a signal is passed from the rate counter and comparator to the sonic transmitter 46.

Since three devices (pickup 45, rate counter 50, and sonic transmitter 46) are electronic devices requiring a source of electrical power, a down-hole power supply 51 is provided. The three devices and the power supply are housed within an enclosure 39. The rate counter and comparator 50 may comprise a digital circuit, preferably a microcomputer programmed to count electrical impulses from the gamma transducer and to activate a sonic transmitter 46 upon preselected count and to activate a different sonic signal indicative of low battery voltage.

Long-life, for example, nickel cadmium or lithium, rechargeable batteries are used to supply power to the down-hole electronic devices. Preferably a charging circuit is provided also. It may comprise a spring loaded diaphragm 61 (see FIG. 2) having one side in communication with the interior of the tubing by an opening 52 in the tubing. Coupled to the diaphragm is a permanent magnet 53 within a stationary coil 54. The ends of the coiled wire are connected to a rectifying circuit (not shown) for generating a D.C. current that charges the battery.

The acoustical pick up 35 at the well head may comprise a solid state microphone which passes its electrical output signal to the controller 36.

According to a preferred embodiment, the controller comprises a computer, for example, a microcomputer, with a reserve battery power supply and solid-state electronic circuitry interfaced with the power supply to actuate the pumping motor. The computer controller may optionally be programmed, in addition to starting and stopping pumping, to record pumping cycles, accumulate and compute average cycle time, record data and time for each of the previous, say ten cycles, have an automatic restart following power failure, have an automatic shut-down if average cycle time is exceeded by an established percentage, and many other features.

Gamma rays comprise electromagnetic radiation emitted from certain atomic nuclei as a result of rearrangements within the nuclei. The energies of nuclear gamma rays range from practically zero up to the order of 10 Mev.

The energy of photon may be absorbed totally or partially by interaction with matter. In the latter case, the frequency of the photon is reduced. Its direction of motion may be changed. Photons are thus absorbed not gradually but in discrete events. One interaction is sufficient to remove a photon from a collimated beam of gamma rays. The intensity I of a beam decreases exponentially as in the equation $$I = I_0 e^{-\mu x}$$

where x is the path length and $I_0$ is the initial intensity and $\mu$ is the linear attenuation coefficient which is characteristic of the material and the gamma energy.

Gamma ray counters are devices for detecting gamma radiation that yield information about the integrated intensity within a time interval or register each photon separately. Geiger tube is frequently used for general purposes but above 100 Mev; its efficiency is low. The most generally used gamma counter is the NaI(Tl) or sodium iodize crystal scintillation counter which is a sodium iodine crystal with thallium present as a sensitizer. The interaction of a photon with this crystal produces a pulse of light which can be detected by a photomultiplier.

Having thus defined my invention with the detail and particularity required by the Patent Laws, what is desired protected by Letters Patent is set forth in the following claims.

I claim:

1. A system for controlling production in an oil well wherein the oil well comprises a cased borehole, tubing within said cased borehole, a pump at the lower end of the tubing arranged to pump oil into said tubing, sucker-rods extending down into said tubing for mechanically activating said pump, means for causing reciprocation of the sucker-rods;

a controller for activating the means for causing reciprocation;

first sensing means secured to the outer surface of the tubing near the lower end thereof comprising a radioactive source spaced from a radioactivity detector such that oil at that level will fill the said space, means associated with said radioactivity detector for counting the output of the detector and establishing an "off signal" when the frequency of the output is indicative of no oil in the said space;

means for converting the "off signal" into a sonic signal directed up the borehole;

an electrical power supply for energizing means for sensing, means for counting and means for converting;

receiving means at the top of the borehole for detecting the acoustical representation of the "off signal" and transmitting it as an electrical signal to said controller whereby said controller stops the means for causing reciprocation.

2. A system according to claim 1 wherein a second sensing means is secured to the outer surface of the tubing spaced above the first sensing means, said second sensing means comprising a radioactive source spaced from a radioactivity detector for counting the outputs of the detector and establishing an "on signal" when the frequency of the outputs is indicative of oil in the space, means associated with the radioactivity detector for converting the "on signal" to a second sonic signal directed up the borehole, said second sonic signal being different from the sonic signal related to the "off signal", said receiving means at the top of the borehole arranged for detecting the said sonic signals and discriminating therebetween, and transmitting electrical "on signals" and "off signals" to the controller to start and stop the means for causing reciprocation.

3. The system according to claims 1 or 2 wherein the radioactive source comprises Cesium 137.

4. The system according to claims 1 or 2 wherein the first and second sensing means comprising a digital circuit for analyzing the frequency of the radioactivity and for generating a signal indicative of the presence or not of oil at the level of the detector.

5. The system according to claim 4 wherein the digital circuit comprises a microcomputer on a chip with a programmed ROM memory.

6. The system according to claims 1 or 2 wherein the acoustical signals produced by the first and second sensors are of different frequencies.

7. The system according to claims 1 or 2 wherein the electrical power supply is rechargeable and means are provided for charging the power supply, said recharging means comprising a spring biased element that reciprocates in response to a change in pressure in the production tubing with each pump cycle, means attached to said element for causing relative movement of the magnetic field and a pick up coil in which the charging current is induced.

8. The system according to claim 6 wherein a small permanent magnet is coupled to a diaphragm and is pushed in and out of the pick up coil having a diode in the coil circuit for rectifying the output and transferring it to a D.C. power storage means.

9. The system according to claim 7 wherein the power storage element comprises a rechargeable battery.

10. The system according to claim 7 wherein the power storage element comprises a capacitor.

11. A method for controlling production in an oil well wherein the oil well comprises a cased borehole, tubing within said cased borehole, a pump at the lower end of the tubing arranged to pump oil into said tubing, sucker-rods extending down into said tubing for mechanically activating said pump, means for causing reciprocation of the sucker-rods comprising the steps for:

sensing radioactivity emitted from a first radioactive source near the lower end of the tubing and generating an "off signal" when the frequency of the radioactivity is indicative of no oil at the level of the radioactive source;

converting the "off signal" into a sonic signal directed up the borehole;

detecting the acoustical representation of the "off signal" at the well head and stopping the reciprocation of the sucker-rods in response to said "off signal".

12. A method according to claim 11 further comprising the steps for sensing radioactivity from a second radioactive source spaced above the first radioactive source and generating an "on signal" when the frequency of the radioactivity is indicative of oil at the level of the second radioactive source, converting the "on signal" to a second sonic signal directed up the borehole, said second sonic signal being different from the sonic signal related to the "off signal".

detecting the said sonic signals and discriminating therebetween at the well head and in response to said "on signals" and "off signals" starting and stopping the reciprocation of the sucker-rods.

* * * * *